US009529596B2

(12) United States Patent
Babayan et al.

(10) Patent No.: US 9,529,596 B2
(45) Date of Patent: Dec. 27, 2016

(54) METHOD AND APPARATUS FOR SCHEDULING INSTRUCTIONS IN A MULTI-STRAND OUT OF ORDER PROCESSOR WITH INSTRUCTION SYNCHRONIZATION BITS AND SCOREBOARD BITS

(75) Inventors: Boris A. Babayan, Moscow (RU); Vladimir M. Pentkovski, Folsom, CA (US); Alexander V. Butuzov, Moscow (RU); Sergey Y. Shishlov, Moscow (RU); Alexey Y. Sivtsov, Moscow (RU); Nikolay E. Kosarev, Moscow (RU)

(73) Assignee: Intel Corporation, Santa Clara, CA (US)

( * ) Notice: Subject to any disclaimer, the term of this patent is extended or adjusted under 35 U.S.C. 154(b) by 1222 days.

(21) Appl. No.: 13/175,619

(22) Filed: Jul. 1, 2011

(65) Prior Publication Data

US 2013/0007415 A1 Jan. 3, 2013

(51) Int. Cl.
*G06F 9/38* (2006.01)
*G06F 9/30* (2006.01)

(52) U.S. Cl.
CPC ............ *G06F 9/3851* (2013.01); *G06F 9/3016* (2013.01); *G06F 9/3824* (2013.01); *G06F 9/3838* (2013.01); *G06F 9/3891* (2013.01)

(58) Field of Classification Search
CPC .................................................. G06F 9/3838
USPC ................................................. 712/216, 217
See application file for complete search history.

(56) References Cited

U.S. PATENT DOCUMENTS

| | | | |
|---|---|---|---|
| 5,537,561 A * | 7/1996 | Nakajima | 712/23 |
| 6,260,189 B1 * | 7/2001 | Batten et al. | 717/151 |
| 6,550,001 B1 * | 4/2003 | Corwin et al. | 712/216 |
| 6,643,762 B1 | 11/2003 | Arnold et al. | |
| 6,950,927 B1 * | 9/2005 | Apisdorf et al. | 712/216 |
| 7,080,234 B2 | 7/2006 | Saulsbury et al. | |
| 7,143,401 B2 | 11/2006 | Babaian et al. | |
| 7,281,250 B2 | 10/2007 | Ohsawa et al. | |
| 7,600,221 B1 * | 10/2009 | Rangachari | 717/128 |

(Continued)

OTHER PUBLICATIONS

Arroyo and Lee, Dynamic Simultaneous Multithreaded Architecture, 2003, 16th International Conference on Parallel and Distributed Computing Systems, pp. 1-8.*

(Continued)

*Primary Examiner* — Andrew Caldwell
*Assistant Examiner* — Jyoti Mehta
(74) *Attorney, Agent, or Firm* — Nicholson De Vos Webster & Elliott LLP

(57) ABSTRACT

In accordance with embodiments disclosed herein, there are provided methods, systems, and apparatuses for scheduling instructions in a multi-strand out-of-order processor. For example, an apparatus for scheduling instructions in a multi-strand out-of-order processor includes an out-of-order instruction fetch unit to retrieve a plurality of interdependent instructions for execution from a multi-strand representation of a sequential program listing; an instruction scheduling unit to schedule the execution of the plurality of interdependent instructions based at least in part on operand synchronization bits encoded within each of the plurality of interdependent instructions; and a plurality of execution units to execute at least a subset of the plurality of interdependent instructions in parallel.

12 Claims, 9 Drawing Sheets

(56) References Cited

U.S. PATENT DOCUMENTS

| | | | |
|---|---|---|---|
| 7,721,071 | B2 | 5/2010 | Jiang et al. |
| 8,650,554 | B2* | 2/2014 | Elnozahy et al. ............ 717/149 |
| 2002/0138714 | A1 | 9/2002 | Leibholz et al. |
| 2003/0033506 | A1* | 2/2003 | Hinds et al. .................. 712/217 |
| 2003/0120902 | A1* | 6/2003 | Kottapalli et al. ............ 712/216 |
| 2003/0126408 | A1* | 7/2003 | Vajapeyam et al. .......... 712/214 |
| 2004/0073777 | A1* | 4/2004 | Arnold et al. ................ 712/217 |
| 2004/0162972 | A1 | 8/2004 | Iacobovici et al. |
| 2005/0251664 | A1* | 11/2005 | Caprioli et al. ............. 712/228 |
| 2005/0268075 | A1* | 12/2005 | Caprioli et al. ............. 712/239 |
| 2007/0204135 | A1 | 8/2007 | Jiang et al. |
| 2008/0046698 | A1* | 2/2008 | Ahuja et al. ................. 712/224 |
| 2008/0209173 | A1* | 8/2008 | Evers et al. ................. 712/207 |
| 2009/0217020 | A1 | 8/2009 | Yourst |
| 2010/0005277 | A1* | 1/2010 | Gibert et al. ................ 712/220 |
| 2010/0070740 | A1 | 3/2010 | Allen et al. |
| 2010/0274972 | A1* | 10/2010 | Babayan et al. ............. 711/125 |

OTHER PUBLICATIONS

Tariq Jamil, RAM versus CAM, Apr./May 1997, IEEE Xplore, pp. 26-29.*
6.823 Computer System Architecture Scoreboarding for in-order issues, Oct. 27, 2005, pp. 1-2.*
Foldoc accumulator, Apr. 20, 1990, Foldoc, pp. 1-3.*
PCT International Search Report for PCT/US2012/045286, Mailing date of Dec. 26, 2012, pp. 1-3.*
Office Action and Taiwan Search Report from foreign counterpart Taiwan Patent Application No. 101123731, mailed Dec. 27, 2014, 12 pages.
Arroyo, et al., "Dynamic Simultaneous Multithreaded Architecture", 16th International Conference on Parallel and Distributed Computing Systems, 2003, pp. 1-8.
Jamil, Tariq, "RAM versus CAM", IEEE Xplore, Apr./May 1997, pp. 26-29.
International Preliminary Report on Patentability for International Application No. PCT/US2012/045286 , mailed Jan. 16, 2014, 6 pages.
McNairy C., et al., "Itanium 2 Processor Microarchitecture", Apr. 2003, Micro, IEEE, vol. 23, Issue 2, pp. 44-55.
Ohsawa T., "Pinot: Speculative Multi-threading Processor Architecture Exploiting Parallelism over a Wide Range of Granularities," Proceedings of the 38th Annual IEEE/ACM International Symposium on Microarchitecture (MICRO'05), IEEE, 2005, 12 pages.
Thornton J.E., "Parallel Operation in the Control Data 6600", Proceedings-Spring Joint Computer Conference, 1964, pp. 33-40.
Tomasulo R.M., "An Efficient Algorithm for Exploiting Multiple Arithmetic Units" IBM Journal, 1967, pp. 25-33.
Tseng F., et al., "Achieving Out-of-Order Performance with Almost in-Order Complexity" International Symposium on Computer Architecture, IEEE, 2008, 10 pages.
Written Opinion for International Application No. PCT/US2012/045286, mailed Dec. 26, 2012, 4 pages.

* cited by examiner

METHOD AND APPARATUS FOR SCHEDULING INSTRUCTIONS IN A MULTI-STRAND OUT OF ORDER PROCESSOR WITH INSTRUCTION SYNCHRONIZATION BITS AND SCOREBOARD BITS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly to methods, systems, and apparatuses for the scheduling of instructions in a multi-strand out-of-order processor.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to disclosed embodiments.

Within a computer processor, such as a central processing unit (CPU), various operations or stages must be performed for the CPU to perform any beneficial task. Within the CPU, the concept of an instruction fetch corresponds to the operation of retrieving an instruction from program memory communicatively interfaced with the CPU so that it may undergo further processing (e.g., instruction decode, instruction execute, and write back of the results). Each of these operations consume time or CPU clock cycles, and thus, inhibit speed and efficiency of the processor.

The concepts of pipelining and superscalar CPU processing thus implement what is known in the art as Instruction Level Parallelism (ILP) within a single processor or processor core to enable faster CPU throughput of instructions than would otherwise be possible at any given clock rate. One of the simplest methods used to accomplish increased parallelism is to begin the first steps of instruction fetching and decoding before the prior instruction finishes executing resulting in a pipeline of instructions for processing. Increased parallelism may also be attained through multiple functional units to simultaneously perform multiple "fetch" operations which are then placed into a pipeline such that an instruction is always available for an execution cycle. In such a way, an opportunity to execute an instruction less likely to be wasted due to having to wait for an instruction to be fetched.

As the complexity and redundancy of functional units increases, so does the overhead penalty for managing the increased instruction level parallelism of the CPU. When the processor performs a simple fetch, decode, execute, and write back cycle in a continuous sequential cycle, there is no worry of dependency on a preceding or subsequent statement. Any change required will have already been processed (e.g., executed and written back) such that any data dependency is already satisfied by the time an otherwise dependent instruction seeks the data. For example, if a second instruction depends upon the result of a first instruction, that result is assured to be available in a simple and sequential fetch, decode, execute, and write back cycle as the subsequent instruction cannot be "fetched" until the prior instruction is "executed," causing the change, and "written back," making the change available.

Thus it can be plainly seen that implementing instruction level parallelism within a CPU presents a risk that a subsequent instruction may potentially be "fetched" and presented for execution before the first instruction is executed and "written back." If the second instruction depends upon the first, dependency is violated. Other dependency types exist as well besides the data dependency example set forth above, such as anti-dependency, control dependency, and output dependency.

Scoreboarding implements a scheduling mechanism by which dependency violations can be avoided (e.g., via waits, stalls, etc.) which would otherwise result in "hazards" or incorrectly processed data, instruction, etc.

Previously known mechanisms allow for instruction level parallelism of the CPU but enforce a requirement that fetch is performed in-order and thus, the extent of instruction level parallelism is so limited. Even where superscalar processors permit out-of-order execution, the extent of instruction level parallelism remains constrained to in-order fetch mechanisms and a correspondingly limited scheduling window.

The present state of the art may therefore benefit from techniques, systems, methods, and apparatuses for the scheduling of instructions in a multi-strand out-of-order processor as described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
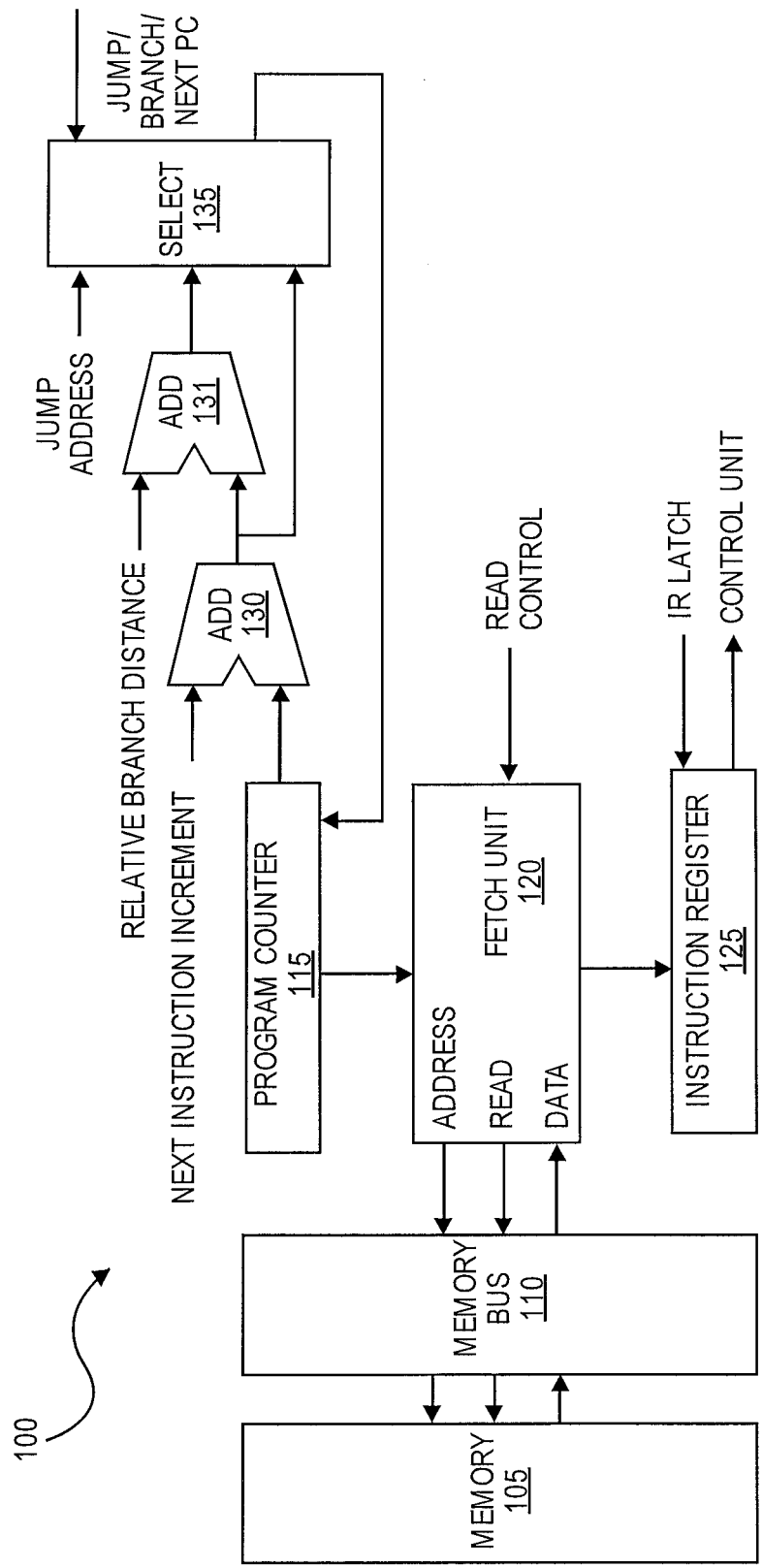
FIG. 1 depicts an exemplary architecture for a prior art fetch operation in a central processor unit's (CPU's) instruction fetch unit which lacks instruction level parallelism.

Described herein are systems, methods, and apparatuses for the scheduling of instructions in a multi-strand out-of-order processor. For example, disclosed mechanisms include interleaving or braiding "strands" (also known as "braids") having instruction therein to form a single program fragment from multiple inter-dependent strands in an out-of-order code fetch mechanism.

For example, in accordance with one embodiment, a system for scheduling instructions in a multi-strand out-of-order processor includes a binary translator to generate a multi-strand representation of a sequential program listing, in which the generated multi-strand representation includes a plurality of interdependent strands, each of the plurality of interdependent strands having operand synchronization bits. In such an embodiment, the system further includes an out-of-order instruction fetch unit to retrieve the plurality of interdependent strands for execution and an instruction scheduling unit to schedule the execution of the plurality of interdependent strands based at least in part on the operand synchronization bits. Such a system may further include, for example, multiple execution units for executing multiple fetched interdependent strands in parallel, subject to appropriate scheduling to resolve dependencies between any of the plurality of strands.

In another embodiment, an apparatus for scheduling instructions in a multi-strand out-of-order processor includes an out-of-order instruction fetch unit to retrieve a plurality of interdependent instructions for execution from a multi-strand representation of a sequential program listing; an instruction scheduling unit to schedule the execution of the plurality of interdependent instructions based at least in part on operand synchronization bits encoded within each of the plurality of interdependent instructions; and a plurality of execution units to execute at least a subset of the plurality of interdependent instructions in parallel.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architecture 100 for a prior art fetch operation in a central processor unit's (CPU's) instruction fetch unit 120 which lacks instruction level parallelism.

Depicted is an instruction fetch unit 120 which takes a program counter 115, and presents the program counter to a memory 105 as an address via an interconnecting memory bus 110. The presentment triggers/signals a read cycle on the memory 105 and latches the data output from the memory 105 to the instruction register 125.

The instruction fetch unit 120 further handles an increment of the program counter 115 to get the next instruction (via adder 130), and the addition of a relative jump address (via adder 131) for program counter 115 relative jumps, or the selection 135 and substitution of a branch address for direct branches.

The program counter 115 will always pull the next instruction in-order. While more sophisticated pipelining buffers may be utilized or even superscalar architecture to provide redundancy of such fetch operations, prior art architecture 100 is nevertheless constrained by an in-order fetch based mechanism insomuch as the program counter 115 will always fetch the "next instruction" on increment.

Figure 2A:
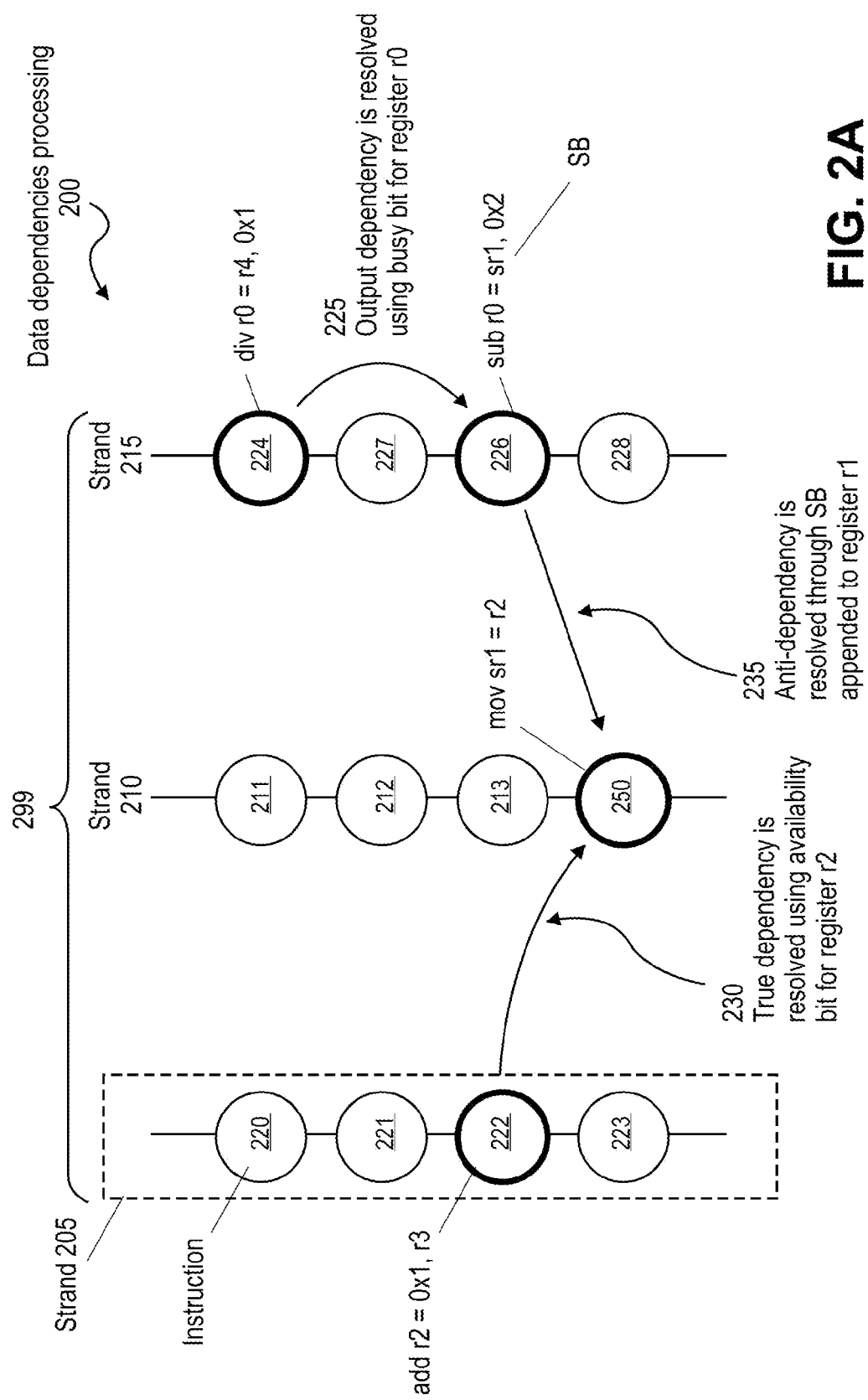
FIG. 2A depicts an exemplary architecture for the scheduling of instructions in a multi-strand out-of-order processor in accordance with which embodiments may operate.

FIG. 2A depicts an exemplary architecture 200 for the scheduling of instructions in a multi-strand out-of-order processor in accordance with which embodiments may operate. In particular, an exemplary architecture for data dependencies processing 200 is shown in additional detail in which the in-order fetch and out-of-order execution capabilities of previously known architectures is overcome in a multi-strand out-of-order processor architecture which improves instruction level parallelism and correspondingly expands an overall instruction scheduling window.

In accordance with one embodiment, a combined software/hardware solution for encoding and detecting register dependencies 230 and 225 between instructions in a multi-strand representation 299 generated by a binary translator (BT) from the original sequential program is described. The multi-strand representation 299 provides the capability to overcome the abovementioned in-order fetch limitations to provide enhanced instruction level parallelism.

A strand (e.g., 205, 210, and 215) is a sequence of instructions predominantly data dependent on each other that is arranged by a binary translator at program compilation time. As depicted, strand 205 includes instructions 220, 221, 222, and 223. Strand 210 includes instructions 211, 212, 213, and 250. Strand 215 includes instructions 224, 227, 226, and 228. The true dependency 230 depicted at instruction 222 of strand 205 and represented by "add r2=0x1, r3" is resolved using the availability bit for register r2. The output dependency 225 depicted at instruction 224 of strand 215 and represented by "div r0=r4, 0x1" is resolved using the busy bit for register r0. The anti-dependency 235 depicted at instruction 226 of strand 215 and represented by "sub r0=sr1, 0x2" is resolved using a Synchronization Bit (SB) appended to register r1, in accordance with the instruction format incorporating such Synchronization Bits as described herein. The instruction format having synchronization bits is described in additional detail below in the discussion of FIG. 3.

Figure 2B:
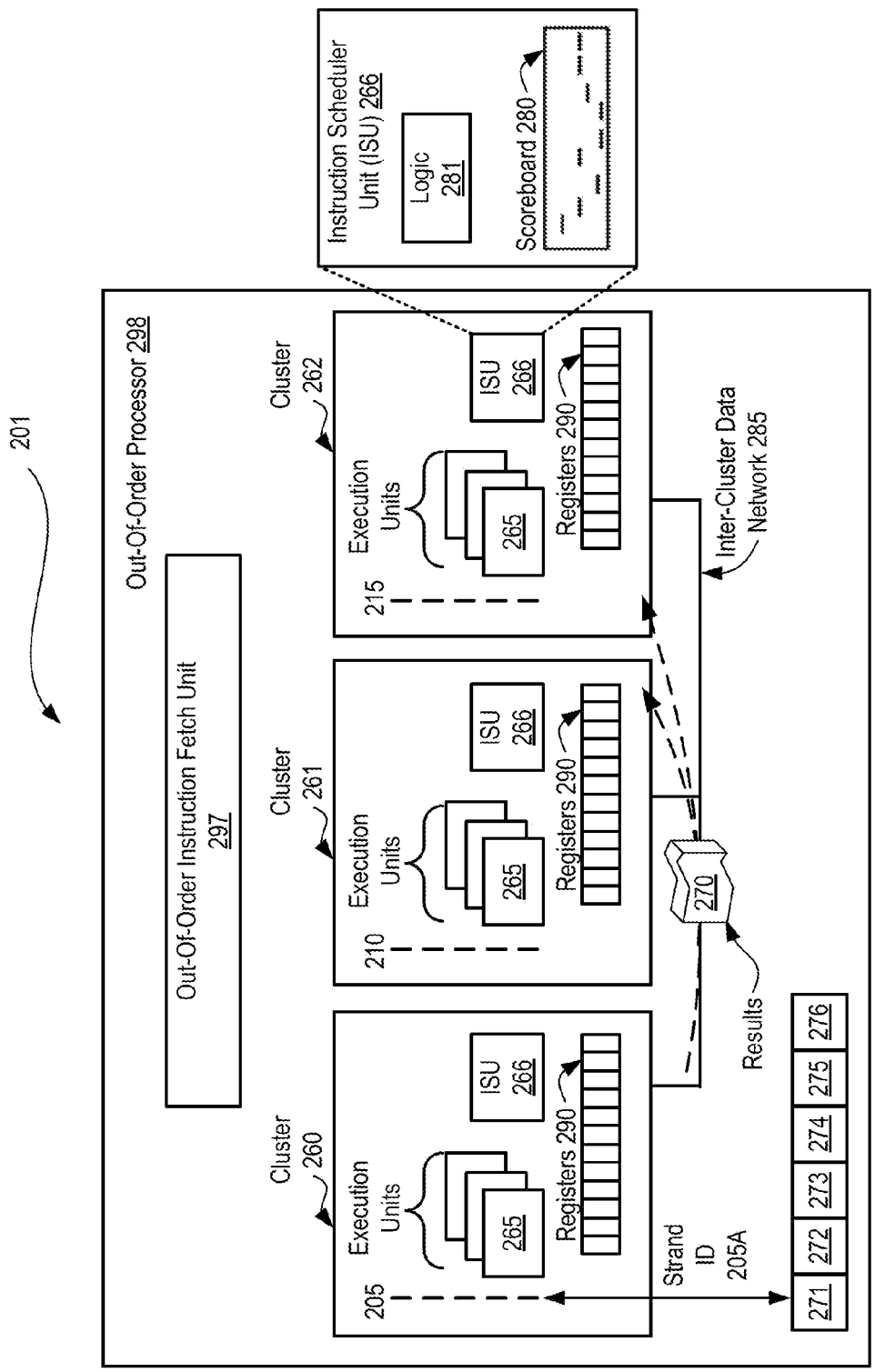
FIG. 2B depicts an exemplary architecture of a multi-strand out-of-order processor in accordance with which embodiments may operate.

FIG. 2B depicts an exemplary architecture 201 of a multi-strand out-of-order processor 298 in accordance with which embodiments may operate. In one embodiment, a multi-strand out-of-order processor 298 is a machine that processes multiple strands 205, 210, 215 (and instruction pointers) in parallel so that instructions (e.g. 220, 211, 224, etc.) from different strands are executed out of program order. Additionally, an out-of-order instruction fetch unit 297 retrieves or fetches interdependent instructions, strands, braids, etc., at least partially out of order. For example, interdependent instructions maybe stored in a sequential order and the out-of-order instruction fetch unit 297 enables fetch and retrieval of the interdependent instructions for execution in an order which is different from the order in which they are stored.

In accordance with one embodiment, a multi-strand out-of-order processor 298 consists of several clusters 260, 261, 262, each cluster in turn processes a portion of the strands 205, 210, 215 via a set of execution units 265 for the respective cluster. Results 270 produced in one cluster (e.g., results 270 from cluster 260) can be transferred to another cluster (e.g., to either 261 or 262) via a set of wires referred to as inter-cluster data network 285. Each cluster 261-262 has an Instruction Scheduler Unit (ISU) 266 that is aimed at correct handling of data dependencies (e.g., 225, 230, 235 from FIG. 2A) among instructions of the same strand (e.g., output dependency 225 of strand 215) as well as dependencies amongst the different strands, known as cross-strand data dependencies (e.g., such as dependencies 230 and 235). Within each ISU 266 is a scoreboard 280 and tag comparison logic 281. Registers 290 are additionally set forth within each of the depicted clusters 261-262.

Strand accumulators 271, 272, 273, 274, 275, and 276 operate in conjunction with the common registers 290. Each strand accumulator 271-276 is dedicated to one strand only and is addressed by the strand identifier (strand ID). For example, the strand 205 within cluster 260 may be uniquely correlated to strand accumulator 271 via the strand ID 205A for strand 205.

In accordance with the disclosed embodiments, a synchronization bit (SB) is a bit appended to an operand address of an instruction to support correct handling of data anti-dependency among dependent instructions (e.g., anti-dependent instruction 226 of FIG. 2A). In accordance with the disclosed embodiments, the synchronization bit cannot be appended to an operand address that is pointing to a strand accumulator 271-276. In such an embodiment, a rule may implement a restriction or hardware logic may enforce such a restriction.

An instruction that is data dependent upon another instruction through a register 290 is referred to as a consumer instruction or consumer of that register. For example, dependencies 225 and 230 depict dependency through a register 290. The instruction that resolves a data dependency through a register 290 thus allowing issuing of a consumer is referred to as a producer instruction or producer of that register 290. A consumer is considered to be ready if all data dependencies of its operands are resolved. A consumer can be in the same strand (e.g., such as dependency 225) as well as in different strand with respect to the producer (e.g., such as dependency 230).

A scoreboard 280 is a hardware table containing the instant status of each register in the machine implementing the multi-strand out-of-order processor 298, each register providing, indicating, or registering the availability of that respective register for its consumers. In one embodiment, scoreboard 280 operates in conjunction with tag comparison logic 281. As depicted, the scoreboard 280 and tag comparison logic 281 reside within each ISU 266 of each cluster 260-262.

In accordance with one embodiment, synchronization of strands 205, 210, 215 through registers is performed via the strand-based architecture 200 and consists of both software (SW) and hardware (HW) components operating in accord to implement the disclosed methodologies. In one embodiment, a software component includes a modified instruction set architecture (ISA) having functionality therein for adding synchronization bits to operands and further having therein functionality for the arrangement of instructions into strands 205, 210, 215 at compilation time. In one embodiment, the arrangement of instructions into strands 205, 210, 215 at compilation time is performed by a binary translator.

The out-of-order instruction fetch unit 297 of the multi-strand out-of-order processor 298 expands the available scheduling window size of the processor 298 over previously known mechanisms by, for example, permitting the retrieval (fetch) of a critical instruction which is not accurately predicted by a branch prediction algorithm, without requiring all sequentially preceding instructions to be fetched. For example, in-order fetch mechanisms limit the scheduling window size of a CPU because a critical instruction cannot be fetched into the CPU, and therefore cannot be considered for execution, until an entire continuous sequence of previous instructions in the executing program is also fetched and stored into the CPU's buffers or queues. In-order fetch therefore requires that all control flow changes in a sequence of instructions for the executing program be correctly predicted by a branch prediction mechanism or face a penalty manifested as inefficiency.

Thus, the ability of CPUs with in-order fetch to exploit ILP is limited by the branch prediction accuracy, the size of CPU buffers or queues, and the speed of fetching a continuous sequence of instructions. Errors in branch prediction triggered by flow control of an executing program therefore lead to inefficiency bottlenecks.

Implementing an out-of-order fetch (e.g., via out-of-order fetch unit 297) allows an instruction to be fetched to the multi-strand out-of-order processor 298 and considered for execution earlier than a previous instruction in the program's sequential listing of instructions. It is therefore unnecessary to delay program execution while an entire continuous sequence of previous instructions in the executing program is also fetched and stored into the CPU's buffers or queues leading up to the necessary instruction, such as is required with previously known mechanisms implementing in-order instruction fetch. Further still, it is not necessary for the multi-strand out-of-order processor 298 to have buffers large enough to keep all the previous instructions in the sequence, and the branch prediction algorithm need not correctly predict each branch in the sequence. The out-of-order fetch unit 297 therefore increases the scheduling window size of the multi-strand out-of-order processor 298 and thus results in a greater exploitation of Instruction Level Parallelism (ILP).

In accordance with one embodiment, the out-of-order fetch architecture of the multi-strand out-of-order processor 298 constitutes a multi-strand architecture in which the compiler splits a program on the instruction level into two or more strands or braids, such that each strand has a corresponding hardware program counter. While each program counter performs fetch sequentially, several program counters operating simultaneously and independently of one another are capable to fetch instructions out of order with regard to a program's sequential listing or the program's provided order of instructions. If the compiler places a critical instruction at the beginning of one of the strands, that instruction will likely be fetched and considered for execution earlier than instructions placed deep in other strands which precede the critical instruction in the original program.

Figure 3:
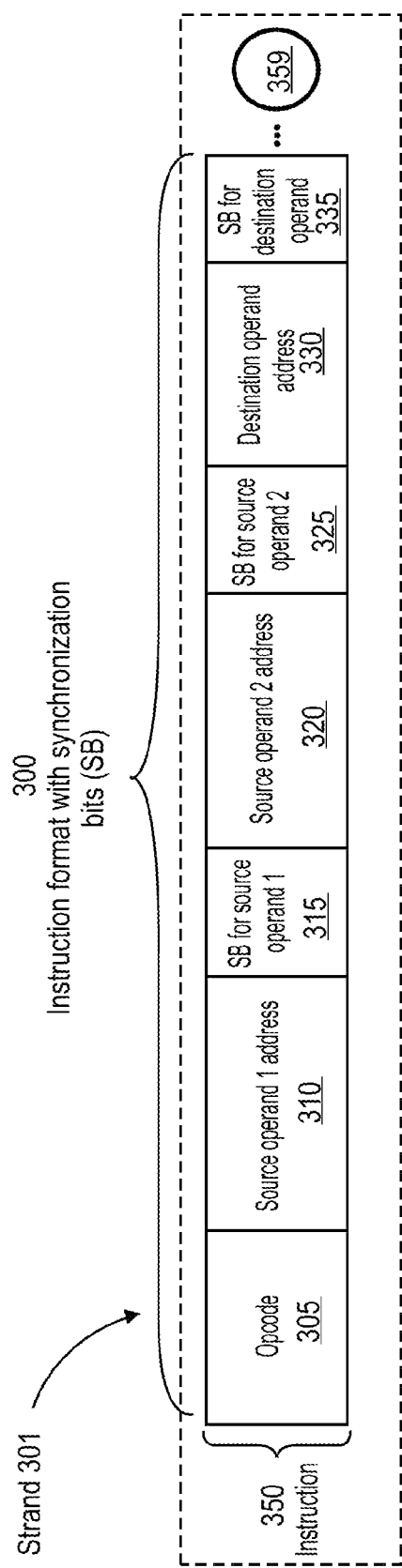
FIG. 3 depicts an exemplary data structure and instruction format of an instruction having synchronization bits in accordance with which embodiments may operate.

FIG. 3 depicts an exemplary data structure and instruction format 300 of an instruction 350 having synchronization bits (315, 325, and 335) in accordance with which embodiments may operate.

To enable synchronization of strands 205, 210, 215 through registers 290, a separate bit, specifically the synchronization bit or "SB," is appended to each source and destination operand in the object code as shown. The resultant format thus includes an exemplary instruction 350 within a strand 301 having op-code 305, source operand 1 address 310, a synchronization bit 315 for the source operand 1, source operand 2 address 320, a synchronization bit 325 for the source operand 2, a destination operand address 330, and a synchronization bit 335 for the destination operand. As shown, multiple instructions 350 . . . 359 may be present within the strand 301, each incorporating a similar format as that depicted in detail with regard to instruction 350.

In one embodiment, a data anti-dependency (e.g., such as anti-dependency 235 at FIG. 2A) is explicitly encoded between an instruction using a value in a register 290 and a second instruction updating the register with a new value. For example, a binary translator sets a synchronization bit of a producer source operand to indicate that the producer source operand is the last use of the data item causing the anti-dependency. The binary translator further sets the synchronization bit of the consumer destination operand to indicate that the instruction must wait until all uses of the previous data item are completed, thus guiding the HW scheduling logic to execute the consumer after the producer.

While generating strands 301 and 205, 210, 215 of FIG. 2A, the binary translator adheres to several conventions or rules that guarantee correct scheduling of strands by the hardware scheduling logic.

In accordance with one embodiment: a first rule prohibits race conditions among instructions belonging to different strands producing the same destination register; and a second rule prohibits race conditions among instructions belonging to different strands reading the same source register with a synchronization bit.

In one embodiment, so as to comply with the first two rules, the binary translator ensures that all such instructions are required to be assigned to the same strand or the execution order for such instructions must be explicitly set through additional data or control dependency. Some situations may or may not be treated as race conditions depending on the program algorithm. For example, two consumers in two different strands having the same source operand address must be prohibited by the binary translator when the program algorithm prescribes that they are dependent on two corresponding producers with the same destination operand address within another strand. If the consumers according to the program algorithm depend on the same producer, then there is no race condition.

In accordance with one embodiment: a third rule prohibits an instruction from having the same source and destination operand addresses, each with a synchronization bit. In such an embodiment, the binary translator prohibits the situation of the third rule as it leads to an ambiguous situation that can't be handled by the scheduling hardware.

In one embodiment, a hardware component implements the aforementioned scoreboard 280 of FIG. 2B and further implements tag comparison logic 281. Scoreboard 280 permits status, check, determination, and assessment of operand readiness for an instruction, thus resolving data dependencies. In accordance with one embodiment, scoreboard 280 and tag comparison logic 281 is configured to allow fetching, issuing and executing instructions from different strands 301 (and 205, 210, 215 of FIG. 2A) out-of-order in accordance with the implementation of a multi-strand out-of-order processor 298 as described herein. In such an embodiment, Scoreboard 280 stores status bits for each register 290 and strand accumulator 271-276 in a multi-strand out-of-order processor 298 and every instruction looks up the scoreboard 280 to determine if its requisite operands are ready. In one embodiment, there are two status bits for each register: an availability bit and a busy bit. In such an embodiment, the strand accumulators 271-276 have only one status bit each, designated as a busy bit. In accordance with one embodiment, the availability bit of a strand accumulator 271-276 is pre-initialized ("set" as a default) and when set, indicates that a register value has been written to a register file (RF) by another instruction and is available for reading. The busy bit, if set, indicates that an instruction is in a processor pipeline updating a register value that has been issued by instruction scheduler unit 266, but has not, as of yet, written new register value. In one embodiment, the status bits of the scoreboard are updated after issuing the instruction.

If an instruction has been identified as ready and is issued from the instruction scheduler unit 266, the instruction scheduler unit 266 sets the busy bit for the destination operand and the source operand with a synchronization bit (315, 325, and 335). If an instruction completes its execution and writes the destination register in the register file, the corresponding availability bit is set and the busy bit is cleared. A synchronization bit (315 or 325) appended to a source operand address (310 or 320) of an instruction 350 indicates that both status bits must be cleared after reading the operand value from the register file. A synchronization bit 335 appended to the destination operand address 330 of an instruction 350 indicates that the instruction must not be issued until both status bits are cleared. An instruction having the same source and destination operand addresses, both with synchronization bits, is prohibited according to the third rule set forth above, as the instruction 350 cannot be issued requiring the corresponding availability bit to be set and cleared simultaneously, without an ambiguous result.

In accordance with one embodiment, data dependencies are resolved thus allowing an instruction to be issued, by checking the status bits of the scoreboard 280 for the operands of instructions 350 residing in an instruction scheduler unit 266 as illustrated by FIG. 2B.

In accordance with one embodiment, true dependencies (e.g., 230) are resolved thus allowing an instruction to be issued, by setting the availability bit and clearing the busy bit corresponding to the destination operand of the producer after writing a produced register value into the register file. Thus, the dependency is resolved if the source operand of a consumer has its availability bit set and its busy bit cleared.

In accordance with one embodiment, so as to resolve an anti-dependency (e.g., 235), synchronization bits appended by a binary translator at program compilation time to the source operand of the producer and the destination operand of the consumer are used. After reading the register value from the register file for the source operand with a synchronization bit by the producer, the corresponding availability bit and busy bit of the operand are cleared. Thus the dependency is resolved if the destination operand with the synchronization bit of the consumer has its availability and busy bits cleared.

In accordance with one embodiment, so as to resolve an output dependency (e.g., 225), the busy bit corresponding to the destination operand of the producer is set immediately after issuing the instruction. Thus the dependency is resolved if the busy bit corresponding to the destination operand of the consumer is cleared. Each instruction reads the scoreboard 280 status to determine the status bits for every operand only once during its allocation into the instruction scheduler unit 266.

In accordance with one embodiment, tag comparison logic 281 monitors the register values being generated by instructions and detects the readiness of instructions waiting in the instruction scheduler unit 266. After a consumer has read the scoreboard 280 but its operand has not yet been identified as ready (e.g., a producer hasn't yet been issued or completed thus it hasn't yet updated the corresponding status bits), its readiness will be detected by the tag comparison logic 281 which monitors register values generated by instructions.

In accordance with one embodiment, tag comparison logic 281 implements a Content Addressable Memory (CAM) that compares operand addresses of producers being executed with operand addresses of consumers residing in the instruction scheduler unit 266. The CAM performs four types of operand address comparison: 1) destination address of the producer with source address of the consumer, 2) source address (310, 320) with synchronization bit (315, 325) of the producer with destination operand address (330) with synchronization bit (335) of the consumer, 3) destination operand address (330) of the producer with destination operand address (330) of the consumer, and 4) source address (310, 320) with synchronization bit (315, 325) of the producer with source address (310, 320) of the consumer. In accordance with one embodiment, comparison types 3) and 4) are performed only if both the producer and the consumer belong to the same strand (e.g., are both instructions within one strand, such as instructions 350 and 359 within exemplary strand 301).

In one embodiment, operand addresses of strand accumulators 271-276 are compared if the consumer and the producer (e.g., instructions 350 and 359 by way of example) belong to the same strand 301 as well. In one embodiment, the tag comparison logic 281 implemented CAM is responsible not only for wakeup of dependent consumers that reside in instruction scheduler unit 266, thus substituting the functionality of availability bits, but the CAM is additionally responsible for stalling the consumers in the instruction scheduler unit 266, thus substituting the functionality of the busy bits. Comparison of source operand address (310 and 320) of the consumer with source operand address (310 and 320) of another consumer being executed belonging to the same strand and having synchronization bit (315, 325) is required in order to identify relevant producer and to resolve a true dependency (e.g., 230) if the consumers read the source operand value from bypass wires. In such an embodiment, either the CAM performs the comparison or the binary translator must properly arrange a corresponding strand, thus delaying the second consumer in order to prevent such a situation.

As CPU architecture development trends shift toward software/hardware co-designed machines that take advantage of binary translation capabilities and are further enabled to more deeply exploit instruction level parallelism by looking up a wider instruction scheduling window than previously known architectures support, more efficient ILP based architectures may benefit from incorporating static instruction scheduling to provide more efficient utilization of the available execution units than with dynamic instruction scheduling based on, for example, Tomasulo's algorithm.

One approach to providing a larger instruction window, such as that which is enabled by the techniques and methodologies described herein, is splitting the initial program control flow graph into fragments (e.g., strands or braids as depicted at 205, 210, 215 of FIG. 2A) executing on a plurality of processing nodes (e.g., as individual threads of execution in, for example, a Multiscalar architecture) such as the clusters 260-262 depicted at FIG. 2B. It is possible for several strands (braids) to occupy the same cluster 260-262.

So as to support data synchronization between the threads, each thread is annotated with the list of registers that it may produce. This list is used to reset the scoreboard's 280 state of the corresponding registers 290 so that the consumers are caused to wait, stall, or delay, for these registers 290 to be produced. Another approach implies partial or full delegation of the instruction scheduling function from the hardware dynamic scheduler to software, thus simplifying the scheduling hardware and providing more efficient utilization of multiple execution channels. However, where previously known mechanisms require in-order fetch, decode and register rename to be maintained, which limits the instruction window size at the same level as the out-of-order superscalar machines, the methods and techniques described herein permit a larger scheduling window by fully adopting an out-of-order instruction fetch unit 297, thus overcoming the prior limitations.

Unlike previously known mechanisms which describe the synchronization of streams of wide instructions using special synchronization operations where each stream is executed by a separate processor of single-chip multiprocessor system, the mechanisms and techniques described herein provide for the synchronization of interdependent one instruction wide streams (strands, braids) within one processor core involving synchronization bits appended to instruction operand addresses. Unlike previously known multiscalar architectures, the mechanisms and techniques described herein maintain program order on the level of single instructions, and not on the basis of entire strands. Because program order is maintained on the level of single instructions, the register synchronization information is fetched in an order different from the program order, thus providing the ability to interleave instructions from a single program fragment in multiple strands. Strands (or "braids") having instruction therein are thus interleaved, interwoven, or braided, to form a single program fragment from multiple inter-dependent strands in an out-of-order code fetch mechanism. Previously known mechanisms assume that threads are spawned in the program order, and a newly spawned thread receives the list of registers that need to be provided by the previous threads. Conversely, no such requirement exists to practice the disclosed embodiments as set forth herein. And unlike previously known mechanisms, the disclosed mechanisms and techniques do not require in-order fetch, but to the contrary, the disclosed mechanisms adopt an out-of-order code fetch, thus enabling a larger out-of-order window of scheduling, and thus, much deeper Instruction Level Parallelism (ILP).

Figure 4:
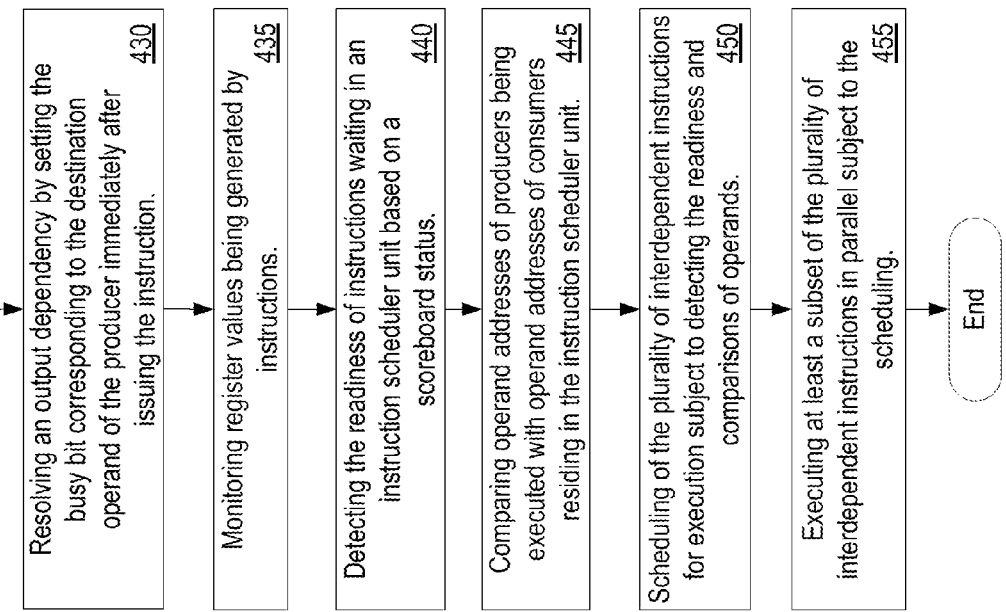
FIG. 4 is a flow diagram illustrating a method for the scheduling of instructions in a Multi-Strand Out-Of-Order Processor in accordance with disclosed embodiments.
Figure 4:
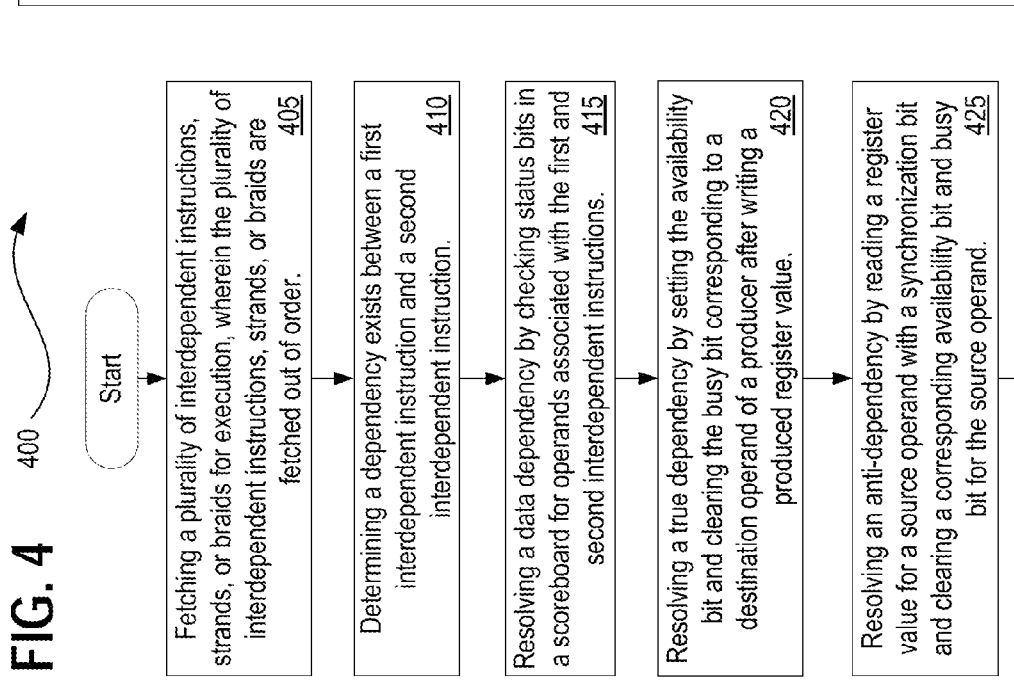

FIG. 4 is a flow diagram illustrating a method for the scheduling of instructions in a multi-strand out-of-order processor in accordance with disclosed embodiments. Method 400 may be performed by processing logic that may include hardware (e.g., circuitry, dedicated logic, programmable logic, microcode, etc.), software (e.g., instructions run on a processing device to perform the methodologies and operations described herein, such as the scheduling of instructions in a multi-strand out-of-order processor to enhance ILP. In one embodiment, method 400 is performed by an integrated circuit or a system having an integrated circuit therein, such as the multi-strand out-of-order processor 298 architecture depicted by FIG. 2B. Some of the blocks and/or operations of method 400 are optional in accordance with certain embodiments. The numbering of the blocks presented is for the sake of clarity and is not intended to prescribe an order of operations in which the various blocks must occur.

Method 400 begins with processing logic for fetching a plurality of interdependent instructions, strands, or braids for execution, wherein the plurality of interdependent instructions, strands, or braids are fetched out of order (block 405).

At block 410, processing logic determines a dependency exists between a first interdependent instruction and a second interdependent instruction.

At block 415, processing logic resolves a data dependency by checking status bits in a scoreboard for operands associated with the first and second interdependent instructions.

At block 420, processing logic resolves a true dependency by setting the availability bit and clearing the busy bit corresponding to a destination operand of a producer after writing a produced register value.

At block 425, processing logic resolves an anti-dependency by reading a register value for a source operand with a synchronization bit and clearing a corresponding availability bit and busy bit for the source operand.

At block 430, processing logic resolves an output dependency by setting the busy bit corresponding to the destination operand of the producer immediately after issuing the instruction.

At block 435, processing logic monitors register values being generated by instructions.

At block 440, processing logic detects the readiness of instructions waiting in an instruction scheduler unit based on a scoreboard status.

At block 445, processing logic compares operand addresses of producers being executed with operand addresses of consumers residing in the instruction scheduler unit.

At block 450, processing logic schedules the plurality of interdependent instructions for execution subject to detecting the readiness and comparisons of operands.

At block 455, processing logic executes at least a subset of the plurality of interdependent instructions in parallel subject to the scheduling.

Figure 5:
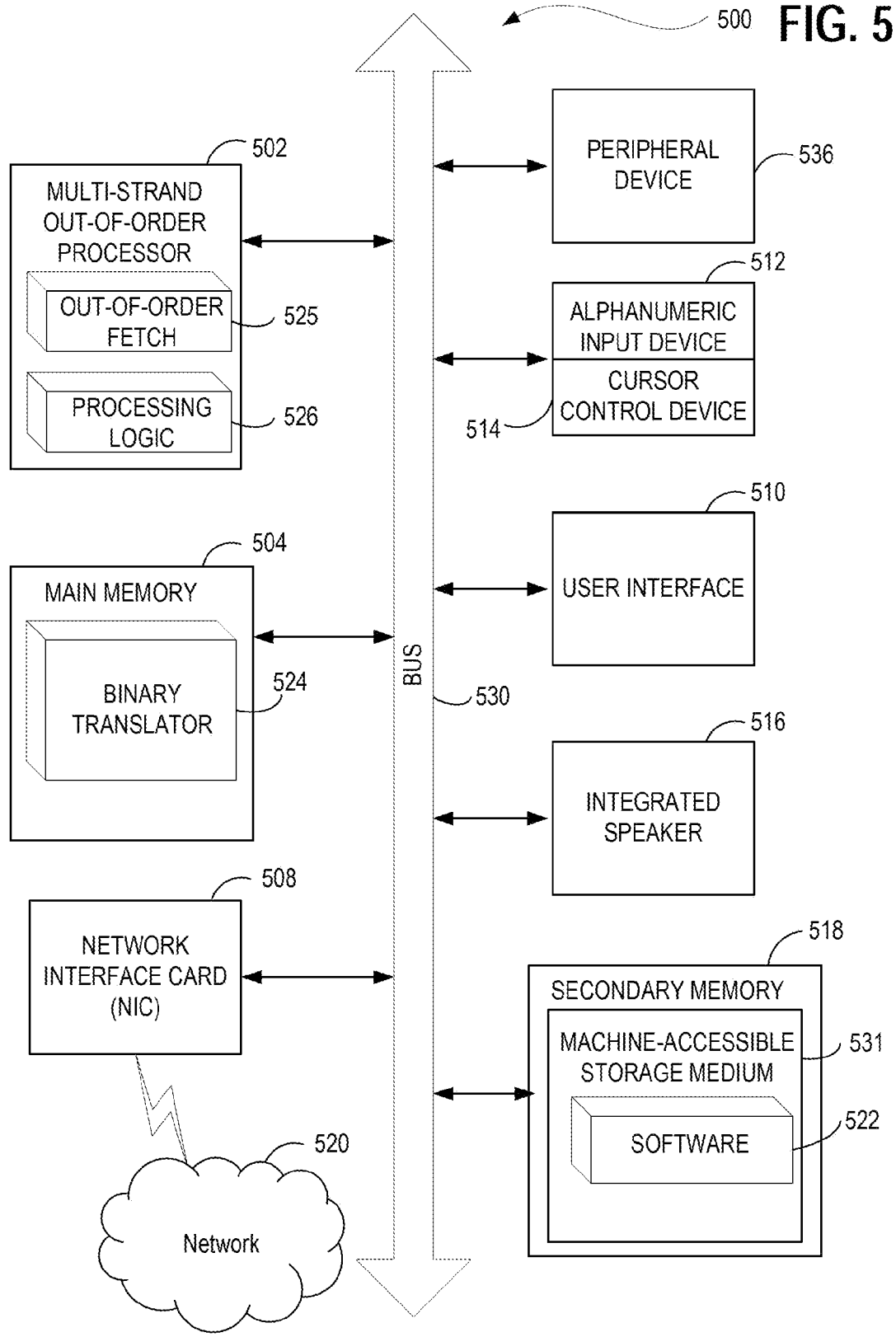
FIG. 5 illustrates a diagrammatic representation of a machine having a multi-strand out-of-order processor in the exemplary form of a computer system, in accordance with one embodiment.

FIG. 5 illustrates a diagrammatic representation of a machine 500 having a multi-strand out-of-order processor in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a multi-strand out-of-order processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives), which communicate with each other via a bus 530. Main memory 504 includes binary translator 524 to provide a program representation from an original sequential program listing for processing by the multi-strand out-of-order processor 502. The binary translator 524 operates in conjunction with the out-of-order fetch unit 525 and processing logic 526 of the multi-strand out-of-order processor 502 to perform the methodologies discussed herein.

Multi-strand out-of-order processor 502 incorporates the capabilities of one or more general-purpose processing devices such as a microprocessor, central processing unit, or the like. Multi-strand out-of-order processor 502 is configured to fetch instruction strands via out-of-order fetch unit 525 and execute the fetched instruction strands via processing logic 526 to perform the operations and methodologies discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the multi-strand out-of-order processor 502 during execution thereof by the computer system 500, the main memory 504 and the multi-strand out-of-order processor 502 also constituting machine-readable storage media. The software 522 may further be transmitted or received over a network 520 via the network interface card 508.

Figure 6:
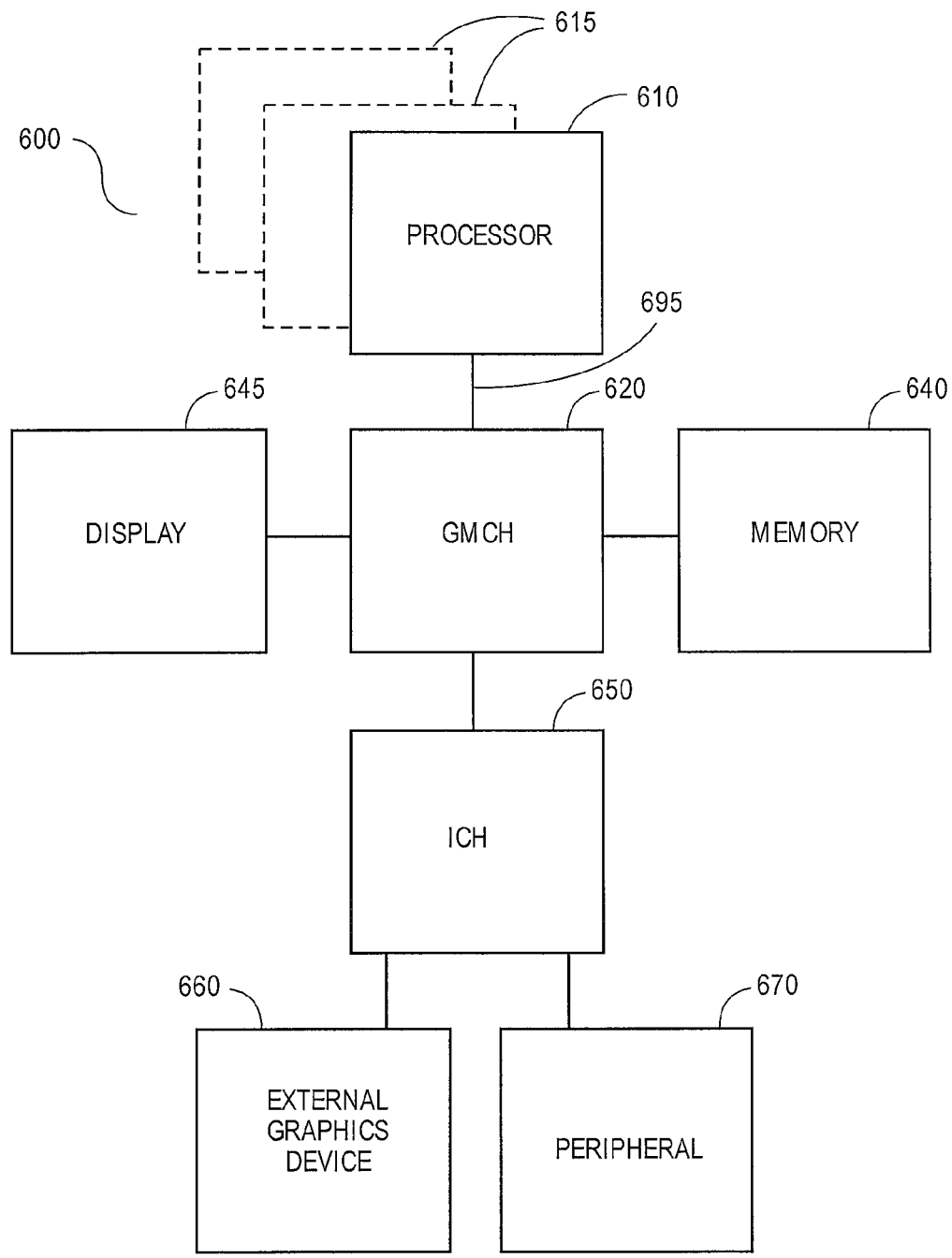
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610,615 may be some version of the processor 500. However, it should be noted that it is unlikely that integrated graphics logic and integrated memory control units would exist in the processors 610,615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processor(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, microarchitectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
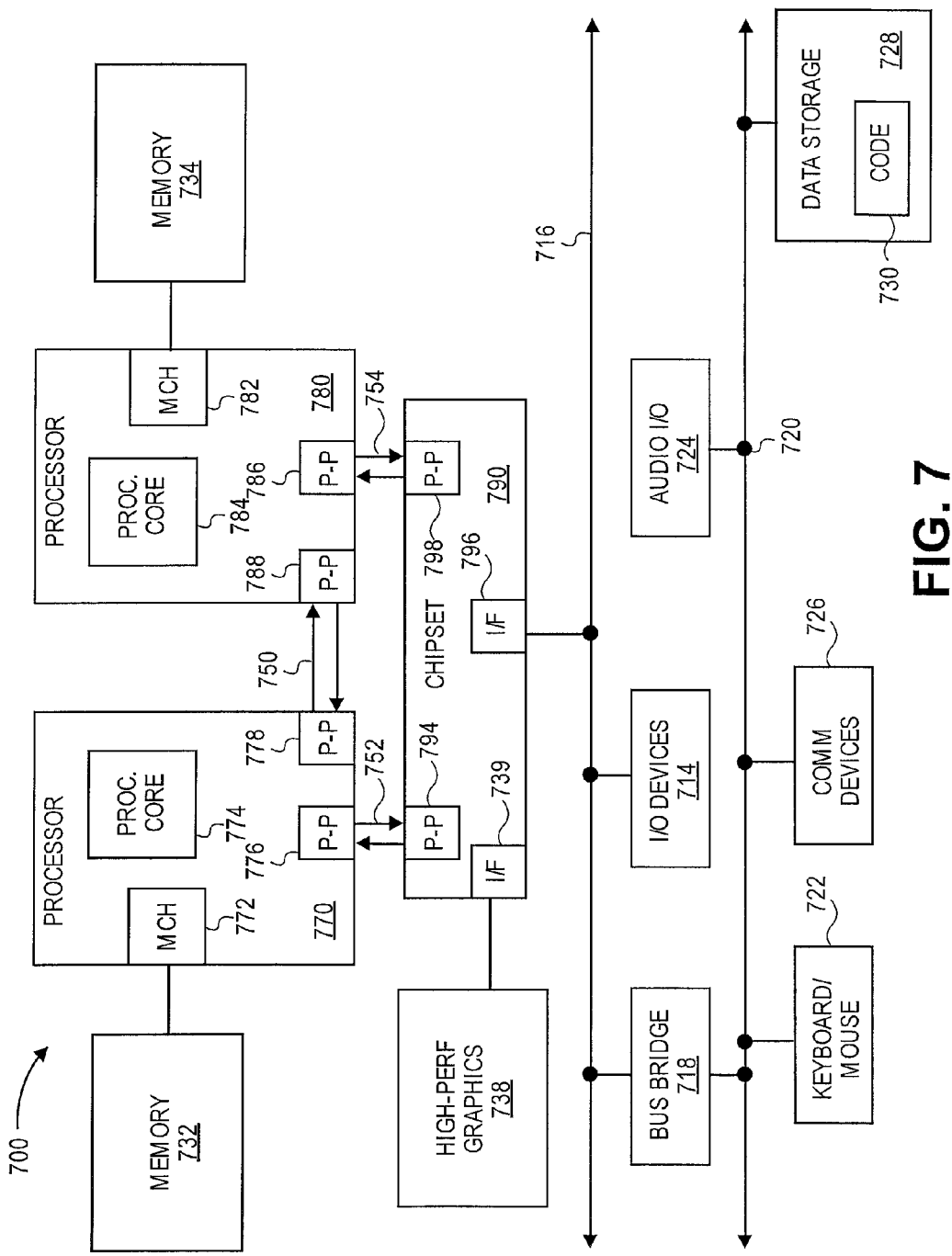
FIG. 7 is a block diagram of a computer system according to one embodiment.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610,615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
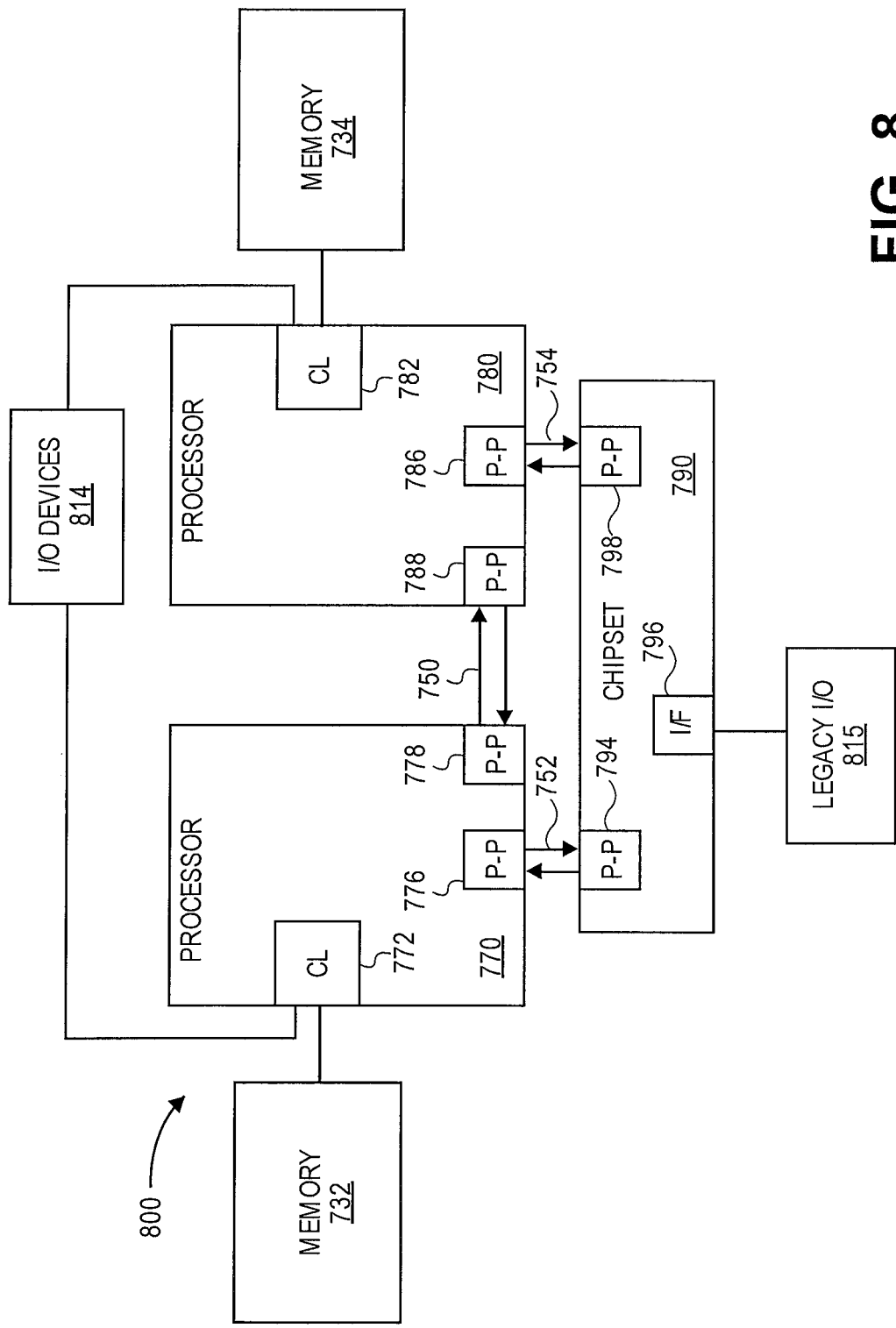
FIG. 8 is a block diagram of a computer system according to one embodiment.

Referring now to FIG. 8, shown is a block diagram of a third system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as that described above in connection with FIG. 7. In addition, CL 872, 882 may also include I/O control logic. FIG. 8 illustrates that not only are the memories 832, 834 coupled to the CL 872, 882, but also that I/O devices 814 are also coupled to the control logic 872, 882. Legacy I/O devices 815 are coupled to the chipset 890.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. An apparatus comprising:
    an out-of-order instruction fetch unit to retrieve a plurality of dependent instructions for execution from a multi-strand representation of a sequential program listing;
    a plurality of registers to store data;
    an instruction scheduling unit to schedule the execution of the plurality of dependent instructions based at least in part on an operand synchronization bit encoded within each of the plurality of dependent instructions for each operand, wherein the instruction scheduling unit is to include a scoreboard implemented via a hardware table, the scoreboard is to contain a status of each of the plurality of registers and is to indicate operand readiness for each of the plurality of dependent instructions via an availability bit and a busy bit per register, wherein when the availability bit for a register is set, it is to indicate that the register has been written to and is available for reading, and wherein when the busy bit for the register is set, it is to indicate that an instruction that has been issued by the instruction scheduling unit is updating and not written a value in the register, and wherein a synchronization bit for a source operand of an instruction when set is to indicate that both the availability bit and the busy bit for that source operand are to be cleared after reading that source operand value, a synchronization bit for a destination operand of an instruction is to indicate that the instruction with the destination operand is to not be issued until both the availability bit and the busy bit for that destination operand are cleared; and
    a plurality of execution units to execute at least a subset of the plurality of dependent instructions in parallel.

2. The apparatus of claim 1, wherein the apparatus comprises an integrated circuit implementing a multi-strand out-of-order processor.

3. The apparatus of claim 1, wherein the plurality of
    dependent instructions are to be stored in a sequential order; and
    wherein the out-of-order instruction fetch unit is to retrieve the plurality of dependent instructions for execution in an order which is different from the order in which they are stored.

4. The apparatus of claim 1, wherein the plurality of
    dependent instructions constitute a compiled multi-strand representation of a sequential program listing.

5. The apparatus of claim 1, further comprising tag comparison circuit to monitor a plurality of register values generated by instructions executed via the plurality of execution units and to further detect instruction readiness for one or more of the plurality of dependent instructions awaiting execution at the instruction scheduling unit.

6. The apparatus of claim 5, further comprising a Content Addressable Memory (CAM), operable in conjunction with the tag comparison circuit, to compare operand addresses of producer type dependent instructions being executed with operand addresses of consumer type dependent instructions awaiting execution at the instruction scheduling unit, wherein a producer type dependent instruction is an instruction that resolves a data dependency through a register and a consumer type dependent instruction is an instruction considered to be ready when all data dependencies of its operands are resolved.

7. The apparatus of claim 6, wherein the CAM is to implement each of the following address comparisons:
    1) a destination address of a producer type dependent instruction is compared with a source address of a consumer type dependent instruction;
    2) a source address with an appended synchronization bit of a producer type dependent instruction is compared with a destination address with an appended synchronization bit of a consumer type dependent instruction;
    3) a destination address of a producer type dependent instruction is compared with a destination address of a consumer type dependent instruction; and
    4) a source address with an appended synchronization bit of a producer type dependent instruction is compared with a source address of a consumer type dependent instruction.

8. The apparatus of claim 1, further comprising a plurality of strand accumulators, each to provide a register, wherein each strand accumulator is uniquely dedicated to no more than one strand and addressed by a strand identifier.

9. The apparatus of claim 8, wherein the scoreboard is to operate in conjunction with tag comparison circuit to monitor a plurality of register values being generated by instructions executed via the plurality of execution units and to further resolve dependencies among two or more of the plurality of dependent instructions awaiting execution at the instruction scheduling unit.

10. A method comprising:
    fetching a plurality of dependent instructions for execution, wherein the plurality of dependent instructions are fetched out of order;
    determining a dependency exists between a first dependent instruction and a second dependent instruction among the plurality of dependent instructions;
    resolving the dependency through scheduling of the plurality of dependent instructions based at least in part on synchronization bits encoded within each of the plurality of dependent instructions by setting an availability bit and clearing a busy bit corresponding to a destination operand of a producer corresponding to the first dependent instruction after writing a produced register value, wherein the dependency is resolved when a source operand of a consumer corresponding to the second dependent instruction has its respective availability bit set and its respective busy bit cleared, wherein the producer is an instruction that resolves a data dependency through a register and the consumer is an instruction considered to be ready when all data dependencies of its operands are resolved, wherein resolving the dependency through scheduling of the plurality of dependent instructions based at least in part on the synchronization bits encoded within each of the plurality of dependent instructions comprises resolving an anti-dependency by reading a register value for a source operand with a synchronization bit corresponding to the first dependent instruction and clearing a corresponding availability bit and busy bit for the source operand, wherein the dependency is resolved when a destination operand with a synchronization bit of the consumer corresponding to the second dependent instruction has its respective availability bit and busy bit cleared; and executing at least a subset of the plurality of dependent instructions in parallel subject to the scheduling.

11. The method of claim 10, wherein resolving the dependency through scheduling of the plurality of dependent instructions based at least in part on the synchronization bits encoded within each of the plurality of dependent instructions comprises:

resolving a data dependency by checking status bits in a scoreboard for operands of the first dependent instruction and the second dependent instruction having the dependency.

12. The method of claim 10, wherein resolving the dependency through scheduling of the plurality of dependent instructions based at least in part on the synchronization bits encoded within each of the plurality of dependent instructions comprises:

resolving an output dependency by setting a busy bit corresponding to the destination operand of the producer corresponding to the first dependent instruction immediately after issuing the first dependent instruction, wherein the dependency is resolved when a busy bit corresponding to the destination operand of the consumer is cleared, wherein the consumer corresponds to the second dependent instruction.

* * * * *